(12) United States Patent
Miyagawa et al.

(10) Patent No.: US 9,205,571 B2
(45) Date of Patent: Dec. 8, 2015

(54) METHOD AND APPARATUS FOR SINTERING FLAT CERAMICS

(71) Applicant: NITTO DENKO CORPORATION, Osaka (JP)

(72) Inventors: Hiroaki Miyagawa, Oceanside, CA (US); Guang Pan, Carlsbad, CA (US); Hironaka Fujii, Carlsbad, CA (US); Bin Zhang, San Diego, CA (US); Amane Mochizuki, Carlsbad, CA (US); Toshitaka Nakamura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 222 days.

(21) Appl. No.: 13/842,878

(22) Filed: Mar. 15, 2013

(65) Prior Publication Data

US 2013/0288875 A1 Oct. 31, 2013

Related U.S. Application Data

(60) Provisional application No. 61/635,129, filed on Apr. 18, 2012.

(51) Int. Cl.
*C04B 33/32* (2006.01)
*B28B 23/02* (2006.01)
(Continued)

(52) U.S. Cl.
CPC ............... *B28B 23/028* (2013.01); *B32B 18/00* (2013.01); *C04B 35/44* (2013.01); *C04B 35/6261* (2013.01); *C04B 35/6264* (2013.01); *C04B 35/6342* (2013.01); *C04B 35/645* (2013.01); *C09K 11/7706* (2013.01); *C09K 11/7774* (2013.01); *C04B 2235/3224* (2013.01); *C04B 2235/3227* (2013.01); *C04B 2235/3418* (2013.01); *C04B 2235/441* (2013.01); *C04B 2235/5409* (2013.01); *C04B 2235/604* (2013.01); *C04B 2235/606* (2013.01); *C04B 2235/6025* (2013.01); *C04B 2235/6562* (2013.01); *C04B 2235/6565* (2013.01); *C04B 2235/6581* (2013.01); *C04B 2235/764* (2013.01);
(Continued)

(58) Field of Classification Search
CPC ................ C04B 33/326; C04B 35/645; C04B 2235/6025
USPC ........................................................ 264/650
See application file for complete search history.

(56) References Cited

U.S. PATENT DOCUMENTS 3,879,509 A 4/1975 Elderbaum
4,009,238 A 2/1977 Niedermeier et al.
(Continued)

FOREIGN PATENT DOCUMENTS

JP 2000304459 A 11/2000
JP 2002029857 A 1/2002
(Continued)

OTHER PUBLICATIONS

International Search Report mailed on Sep. 2, 2013 for Application No. PCT/US2013/037251.

*Primary Examiner* — Joseph S Del Sole
*Assistant Examiner* — Russell Kemmerle, III
(74) *Attorney, Agent, or Firm* — K&L Gates LLP; Louis C. Cullman; Brent A. Johnson

(57) ABSTRACT

A method and apparatus for sintering flat ceramics using a mesh or lattice is described herein.

33 Claims, 3 Drawing Sheets

Flat plate, thickness: B

Warped ceramics, thickness: C + E

Flat plate, thickness: A

(51) Int. Cl.
  *C09K 11/77* (2006.01)
  *B32B 18/00* (2006.01)
  *C04B 35/44* (2006.01)
  *C04B 35/626* (2006.01)
  *C04B 35/634* (2006.01)
  *C04B 35/645* (2006.01)

(52) U.S. Cl.
  CPC ....... *C04B2235/95* (2013.01); *C04B 2235/963* (2013.01); *C04B 2235/9638* (2013.01); *C04B 2237/343* (2013.01); *C04B 2237/567* (2013.01); *C04B 2237/66* (2013.01); *C04B 2237/704* (2013.01)

(56) References Cited

U.S. PATENT DOCUMENTS

| | | | |
|---|---|---|---|
| 4,259,061 A * | 3/1981 | Dubetsky | 432/13 |
| 4,340,436 A | 7/1982 | Dubetsky et al. | |
| 4,421,700 A * | 12/1983 | Patel | 264/640 |
| 4,753,694 A | 6/1988 | Herron et al. | |
| 5,085,720 A | 2/1992 | Mikeska et al. | |
| 5,130,067 A | 7/1992 | Flaitz et al. | |
| 5,149,264 A | 9/1992 | Horikawa et al. | |
| 5,370,759 A | 12/1994 | Hakotani et al. | |
| 5,502,013 A | 3/1996 | James | |
| 5,620,637 A | 4/1997 | Kaga et al. | |
| 5,874,162 A | 2/1999 | Bastian et al. | |
| 6,562,169 B2 | 5/2003 | Natarajan et al. | |
| 6,607,620 B2 | 8/2003 | Knickerbocker et al. | |
| 6,808,676 B1 * | 10/2004 | Eisele | 264/607 |
| 7,045,239 B2 | 5/2006 | Donelson et al. | |
| 7,332,228 B2 * | 2/2008 | Fukaya et al. | 428/469 |
| 8,597,567 B2 * | 12/2013 | Yokoyama et al. | 264/650 |
| 2002/0042037 A1 | 4/2002 | Fukushima et al. | |
| 2007/0126017 A1 * | 6/2007 | Krames et al. | 257/98 |
| 2007/0128504 A1 * | 6/2007 | Horiuchi et al. | 429/44 |
| 2008/0206561 A1 | 8/2008 | Yokoyama et al. | 428/402 |
| 2010/0015396 A1 * | 1/2010 | Johnson et al. | 428/142 |
| 2010/0119800 A1 | 5/2010 | Yokoyama et al. | 428/220 |
| 2012/0135215 A1 * | 5/2012 | McEvoy et al. | 428/220 |
| 2012/0326344 A1 * | 12/2012 | Kelso et al. | 264/21 |
| 2013/0277613 A1 * | 10/2013 | Miyagawa et al. | 252/301.4 R |

FOREIGN PATENT DOCUMENTS

| | | |
|---|---|---|
| JP | 2002293651 A | 10/2002 |
| WO | 2013/158932 A1 | 10/2013 |

* cited by examiner

A

B

METHOD AND APPARATUS FOR SINTERING FLAT CERAMICS

CROSS REFERENCE TO RELATED APPLICATIONS

This application claims the benefit of U.S. provisional patent application No. 61/635,129 filed Apr. 18, 2012, the entire disclosure of which is incorporated herein by reference.

SUMMARY

Generally, ceramic materials, such as phosphors, may be sintered by heating a precursor material between two mesh structures. This method may help to reduce camber, or warping and cracking. For example, this method may be useful when the heating is done under pressure.

Some embodiments include a method of sintering a ceramic comprising: heating a ceramic precursor material between a first mesh and a second mesh; wherein at least a portion of a first side of the ceramic precursor material contacts the first mesh and at least a portion a second side of the ceramic precursor contacts the second mesh during heating.

Some embodiments include a sintered ceramic plate made according to a method described herein. Some embodiments include a lighting device comprising the sintered ceramic plate made as described herein.

DETAILED DESCRIPTION

In the methods described herein, a ceramic precursor material is heated between two mesh structures, such as a first mesh and a second mesh. The precursor material is often in the form of a flat plate. Generally, a first side of the plate comes in contact with the first mesh and a second side of the plate comes in contact with the second mesh. The first mesh and the second mesh may be the same or different.

Figure 1:
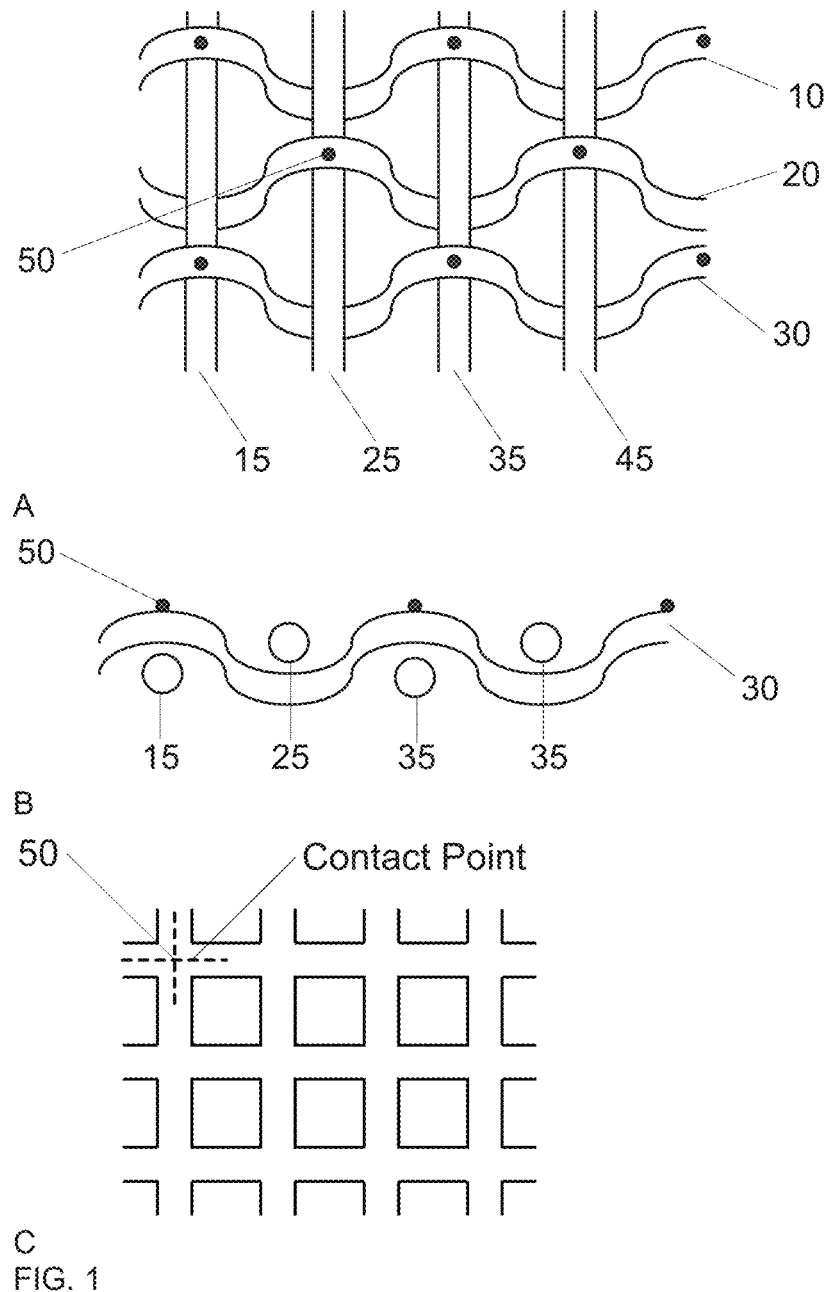
FIG. 1 illustrates some embodiments of a mesh of the present methods.
Figure 2:
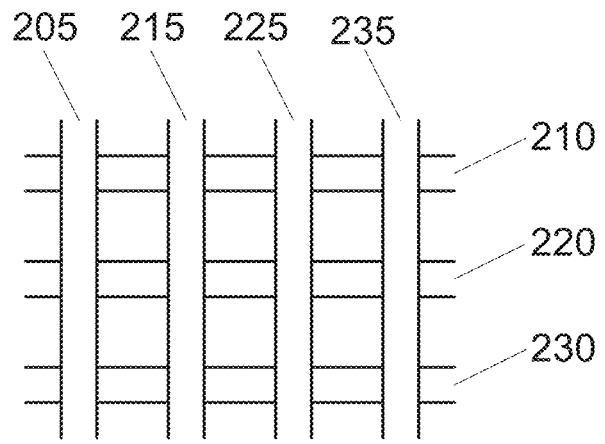
FIG. 2 illustrates another embodiment of a mesh of the present methods.
Figure 2:
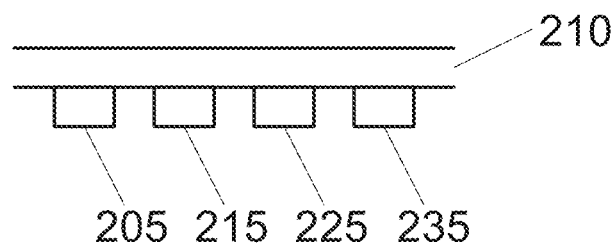

A first mesh or a second mesh (referred to collectively hereafter as "a mesh") may include any structure that comprises intersecting strips or wires. The characteristics of the mesh may vary depending upon the circumstances. For example, a mesh may comprise intersecting strips or wires (referred to collectively hereafter as "wires") that are substantially perpendicular to one another. FIG. 1A depicts an example of such a mesh configuration, wherein wires 10, 20, and 30, and wires 15, 25, 35, and 45 are at substantially right angles. The wires are interwoven so that contacts points, such as contact point 50, are formed. For example, contact point 50 is formed when wire 20 is positioned above wire 15 in the interwoven structure. See also FIGS. 1B and 1C, in which various perspectives of the interwoven wires are depicted. Mesh may be interwoven, as depicted in FIG. 1, or may be configured as shown in FIGS. 2A and 2B, in which wires 205, 215, 225, and 235 overlay wires 210, 220, and 230. Wires may intersect one another at any angle, such as 90°, as depicted in FIG. 2, or at another angle, such as 10°, 15°, 30°, 45°, 60°, 80°, or any angle in a range bounded by, or between, any of these values. In some embodiments, contact points may be periodically, or regularly, distributed throughout the mesh, or the contact points may be substantially uniformly spaced or distributed. Contact points may be substantially the same as one another throughout a mesh.

A mesh may be composed of any material capable of conducting heat, including a metal such as an iron alloy, a copper alloy, niobium, molybdenum, a nickel alloy, platinum, tantalum, titanium, tungsten, etc. Normally, the material of a mesh will have a higher degradation or melting temperature than the sintering temperature of the precursor material to be sintered. In some embodiments the metal has a melting temperature at least 200° C. greater than the desired sintering temperature.

Spacing between wires in a mesh may depend upon the circumstance. In some embodiments, a mesh may have a mesh size of about 5 wires/inch to about 500 wires/inch, 7 wires/inch to about 200 wires/inch, about 10 wires/inch to about 200 wires/inch, about 10 wires/inch to about 100 wires/inch, about 10 wires/inch, about 30 wires/inch, about 40 wires/inch, about 50 wires/inch, about 60 wires/inch, or any mesh size in a range bounded by, or between, any of these values. The mesh size may be the same in both dimensions, e.g. 10×10, 20×20, 30×30, 40×40, 50×50, 60×60, etc. (such as in a square-shaped mesh), or may be different, e.g. 10×20, 20×30, etc. (such as in a rectangular-shaped mesh). The mesh may be in any shape, such as a square, rectangle, circle, oval, etc.

The cross section of a wire in a mesh may be substantially circular (see, e.g., FIGS. 1A-C), or may have another shape such as square, rectangular (see, e.g., FIGS. 2A-B), oval, semicircular, etc. A wire may have a diameter or thickness in any suitable range. For example, some wires may have a diameter of about 10 μm to about 1 mm, about 20 μm to about 500 μm, about 50 μm to about 400 μm, about 69 μm, about 100 μm, about 102 μm, about 127 μm, about 130 μm, about 380 μm, about 381 μm, or any diameter in a range bounded by, or between, any of these values.

In some embodiments, one or both meshes are not bonded to a precursor material before sintering. In some embodiments, a mesh may be slidably contacted with the precursor material. In some embodiments, the precursor material, such as a ceramic compact, may be slidably contacted with the meshes at a plurality of contact points. A ceramic compact may comprise ceramic particles. "Slidably contacted" includes a situation in which solid precursor material can shrink or move in the direction of the plane of contact between the precursor material and a mesh. This may help to reduce the formation of cracks or cambering in a solid ceramic compact.

Any suitable heating regime may be used to heat a precursor material between two mesh structures. For example, the precursor material may be heated to a maximum temperature of about 1000° C. to about 3000° C., about 1500° C. to about 2000° C., or about 1800° C. Heating may occur for as long as desired to obtain the sintering effect sought, such as about 1 hour to about 50 hours, about 3 hours to about 20 hours, about 5 hours to about 20 hours, or, e.g., about 5 hours. In some embodiments, heating to maximum temperature, e.g. 1000-3000° C., may occur over a period of about 1 hour to about 10 hours, and the material may then be held at the maximum temperature for about 1 hour to about 20 hours.

Figure 3:
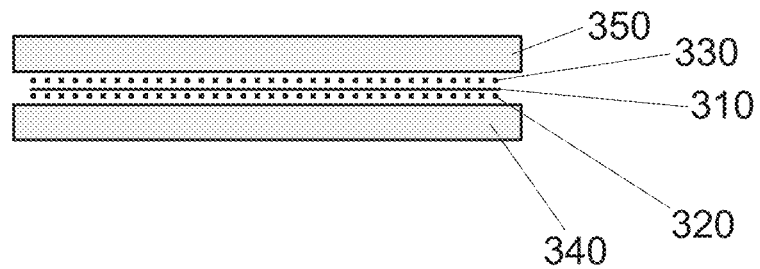
FIG. 3 illustrates an embodiment of a configuration of the present methods including plates for sintering.

In some embodiments, the mesh structures may be heated by a conductive plate, which may be composed of a conductive material such as a metal. Such conductive metal may include an iron alloy, a copper alloy, niobium, molybdenum, a nickel alloy, platinum, tantalum, titanium, tungsten, etc. Heating may be accomplished by using a configuration such as that depicted in FIG. 3. In such a configuration, a precursor material 310 is sandwiched between, and has thermal contact with, a first mesh 320 and a second mesh 330. Mesh 320 in turn has thermal contact with thermal conductive plate 340 and mesh 330 has thermal contact with thermal conductive plate 350. Thus, plate 340 and plate 350 can heat precursor material through the mesh 320 and 330. Mesh 320 and mesh 330 may comprise the same material, or different materials.

This type of configuration may also permit a precursor material, such as precursor material 310, to be pressurized by conductive plates, such as conductive plate 340 and conductive plate 350, which helps to reduce the warping and cracking associated with heating. In some embodiments, sufficient pressure may be applied to the precursor material to reduce camber. In some embodiments, pressure applied is sufficiently low to still permit sliding engagement between the mesh and the precursor materials. In some embodiments, pressure is applied by of the weight of the top plate, which presses through the first and second meshes and the precursor material to the bottom plate. In some embodiments, the top plate e.g. plate 350 (which, for the sake of reference, can be described as being placed on the first mesh), has a weight of about 0.01 $g/cm^2$ to about 100 $g/cm^2$ or about 0.1 $g/cm^2$ to about 20 $g/cm^2$. In some embodiments, a plate has a weight of about 2.5 $g/cm^2$ to about 7.5 $g/cm^2$. In some embodiments, the plates may be 2 inch×2 inch squares of a heat conductive material, such as tungsten, and may weigh about 15 g, about 23 g, or about 25 g.

In some embodiments, cambering is less than about 20%, about 10%, or about 5%, quantified as the amount of cambering as a percentage of the thickness of the flat ceramic piece. In some embodiments, cambering is less than about 100 $\mu m/mm^2$, about 50 $\mu m/mm^2$, or about 10 $\mu m/mm^2$.

A precursor composition may include any composition comprising at least two different atomic elements; e.g., $Al_2O_3$, $ZrO_2$, $Y_2O_3$, etc.

A precursor composition may comprise a bi-elemental oxide, including a compound containing at least two different atomic elements, wherein at least one of the two different elements includes oxygen.

A precursor composition may comprise a bi-elemental non-oxide, including a compound containing at least two different atomic elements, wherein the two different elements do not include oxygen.

In some embodiments, a precursor material may comprise a single or multiple oxide materials.

In some embodiments, a precursor composition can be a precursor host material. In some embodiments, the host material may be powder comprising a single inorganic chemical compound; e.g., YAG powder as compared to yttria and alumina. The host materials can have an average grain size diameter of about 0.1 μm to about 20 μm.

In some embodiments, a precursor composition can comprise phosphor powders. Phosphor powders can include, but are not limited to, oxides, such as oxides of metallic elements or silicon, including silicate, phosphate, aluminate, borate, tungstate, vanatate, titanate, molybdate or combinations of those oxides. Phosphor powders can also include sulfides, oxysulfides, oxyfluorides, nitrides, carbides, nitridobarates, chlorides, phosphor glass or combinations thereof.

In some embodiments, a precursor composition may comprise one or more oxynitrides, such as an oxynitride comprising a metallic element or silicon.

A precursor composition may include a host-dopant material, such as a material that is primarily a single solid state compound, or host material, having a small amount of one or more atoms in the host structure substituted by one or more non-host atoms, or dopant atoms. In some embodiments, a precursor composition can be a garnet host material or a nitride host material. In some embodiments the precursor composition can further comprises a dopant material.

In some embodiments, the precursor composition can include a garnet host material. As used herein, a "garnet" includes any material that would be identified as a garnet by a person of ordinary skill in the art, and any material identified as a garnet herein. In some embodiments, the term "garnet" refers to the tertiary structure of an inorganic compound, such as a mixed metal oxide.

In some embodiments, the garnet may be composed of oxygen and at least two different elements independently selected from groups II, III, IV, V, VI, VII, VIII, or Lanthanide metals. For example, the garnet may be composed of oxygen and a combination of two or more of the following elements: Ca, Si, Fe, Eu, Ce, Gd, Tb, Lu, Nd, Y, La, In, Al, and Ga.

In some embodiments, a synthetic garnet may be described with the formula $A_3D_2(EO_4)_3$, wherein A, D, and E are elements selected from group II, III, IV, V, VI, VII, VIII elements, and Lanthanide metals. A, D, and E may either represent a single element, or they may represent a primary element that represents the majority of A, D, or E, and a small amount of one or more dopant elements also selected from group II, III, IV, V, VI, VII, VIII elements, and Lanthanide metals. Thus, the above formula may be expanded to: (primary A+dopants)$_3$ (primary D+dopants)$_2$([primary E+dopants]$O_4$)$_3$.

In a garnet particle, the primary element or dopant element atom of A (e.g., $Y^{3+}$) may be in a dodecahedral coordination site or may be coordinated by eight oxygen atoms in an irregular cube. Additionally, the primary element or dopant element atom of D (e.g., $Al^{3+}$, $Fe^{3+}$, etc.) may be in an octahedral site. Finally, the primary element or dopant element atom of E (e.g., $Al^{3+}$, $Fe^{3+}$, etc.) may be in a tetrahedral site.

In some embodiments, a garnet can crystallize in a cubic system, wherein the three axes are of substantially equal lengths and perpendicular to each other. In these embodiments, this physical characteristic may contribute to the transparency or other chemical or physical characteristics of the resulting material. In some embodiments, the garnet may be yttrium iron garnet (YIG), which may be represented by the formula $Y_3Fe_2(FeO_4)_3$ or $(Y_3Fe_5O_{12})$. In YIG, the five iron (III) ions may occupy two octahedral and three tetrahedral sites, with the yttrium(III) ions coordinated by eight oxygen ions in an irregular cube. In YIG, the iron ions in the two coordination sites may exhibit different spins, which may result in magnetic behavior. By substituting specific sites with rare earth elements, for example, interesting magnetic properties may be obtained.

Some embodiments comprise metal oxide garnets, such as $Y_3Al_5O_{12}$ (YAG) or $Gd_3Ga_5O_{12}$ (GGG), which may have desired optical characteristics such as transparency or translucency. In these embodiments, the dodecahedral site can be partially doped or completely substituted with other rare-earth cations for applications such as phosphor powders for electroluminescent devices. In some embodiments, specific sites are substituted with rare earth elements, such as cerium. In some embodiments, doping with rare earth elements or other dopants may be useful to tune properties such as optical properties. For example, some doped compounds can luminesce upon the application of electromagnetic energy. In phosphor applications, some embodiments are represented by the formula $(A_{1-x}RE_x)_3D_5O_{12}$, wherein A and D are divalent, trivalent, quadrivalent or pentavalent elements; A may be selected from, for example, Y, Gd, La, Lu, Yb, Tb, Sc, Ca, Mg, Sr, Ba, Mn and combinations thereof; D may be selected from, for example, Al, Ga, In, Mo, Fe, Si, P, V and combinations thereof; and, RE may be rare earth metal or a transition element selected from, for example, Ce, Eu, Tb, Nd, Pr, Dy, Ho, Sm, Er, Cr, Ni, and combinations thereof. This compound may be a cubic material having useful optical characteristics such as transparency, translucency, or emission of a desired color.

In some embodiments, a garnet may comprise yttrium aluminum garnet, $Y_3Al_5O_{12}$ (YAG). In some embodiments, YAG may be doped with neodymium ($Nd^{3+}$). YAG prepared as disclosed herein may be useful as the lasing medium in lasers. Embodiments for laser uses may include YAG doped with neodymium and chromium (Nd:Cr:YAG or Nd/Cr:YAG); erbium-doped YAG (Er:YAG), ytterbium-doped YAG (Yb:YAG); neodymium-cerium double-doped YAG (Nd:Ce:YAG, or Nd, Ce:YAG); holmium-chromium-thulium triple-doped YAG (Ho:Cr:Tm:YAG, or Ho, Cr,Tm:YAG); thulium-doped YAG (Tm:YAG); and chromium (IV)-doped YAG (Cr:YAG). In some embodiments, YAG may be doped with cerium ($Ce^{3+}$). Cerium doped YAG may be useful as phosphors in light emitting devices; e.g., light emitting diodes and cathode ray tubes. Other embodiments include dysprosium-doped YAG (Dy:YAG); and terbium-doped YAG (Tb:YAG), which are also useful as phosphors in light emitting devices.

In some embodiments, the garnet host material can be a precursor material selected from an oxide of yttrium, an oxide of aluminum, and an oxide of gadolinium.

In some embodiments, the nitride host material can be a material having a quaternary host material structure represented by a general formula M-A-B-N:Z. Such a structure may increase the emission efficiency of a phosphor. In some embodiments, M is a divalent element, A is a trivalent element, B is a tetravalent element, N is nitrogen, and Z is a dopant/activator in the host material.

M may be Mg, Be, Ca, Sr, Ba, Zn, Cd, Hg, or a combination thereof. A may be B (boron), Al, Ga, In, Ti, Y, Sc, P, As, Sb, Bi, or a combination thereof. B may be C, Si, Ge, Sn, Ni, Hf, Mo, W, Cr, Pb, Zr, or a combination thereof. Z may be one or more rare-earth elements, one or more transition metal elements, or a combination thereof.

In the nitride material, a mol ratio Z/(M+Z) of the element M and the dopant element Z may be about 0.0001 to about 0.5. When the mol ratio Z/(M+Z) of the element M and the activator element Z is in that range, it may be possible to avoid decrease of emission efficiency due to concentration quenching caused by an excessive content of the activator. On the other hand, when the mole ratio is in that range, it may also be possible to avoid a decrease of emission efficiency due to an excessively small amount of light emission contributing atoms caused by an excessively small content of the activator. Depending on the type of the activating element Z to be added, an optimum percentage of Z/(M+Z) may vary. In some embodiments, a Z/(M+Z) mol ratio in a range from 0.0005 to 0.1 may provide improved emission.

For a composition wherein M is Mg, Ca, Sr, Ba, Zn, or a combination thereof, raw materials can be easily obtained and the environmental load is low. Thus, such a composition may be preferred.

For a composition wherein M is Ca, A is Al, B is Si, and Z is Eu in a material, raw materials can be easily obtained and the environmental load is low. Additionally, the emission wavelength of a phosphor having such a composition is in the red range. A red based phosphor may be capable of producing warm white light with high Color Rendering Index (CRI) at adjusted color temperature when combined with blue light emitting diode (LED) and yellow phosphors. Thus, such a composition may be preferred.

A nitride host precursor can be selected from $Ca_3N_2$ (at least 2N), AlN (at least 3N), $Si_3N_4$ (at least 3N). The term 2N refers to a purity of at least 99% pure. The term 3N refers to a purity of at least 99.9% pure.

In some embodiments, a precursor composition can further include a dopant precursor. In some embodiments, the dopant can be a rare earth compound or a transition metal. In some embodiments, the dopants can be selected from $Ce^{3+}$ and or $Eu^{2+}$. Suitable precursor dopant materials include, but are not limited to, $CeO_2$, $Ce(NO_3)_3$, $[Ce(NO_3)_3] \cdot [6\ H_2O]$, $Ce_2O_3$, and/or EuN. Other suitable precursor dopant materials include the respective metal oxide of the desired dopant material; e.g., oxides of Tm, Pr, and/or Cr.

In some embodiments, a precursor material may be in the form of a ceramic compact. A ceramic compact includes precursor material that is compacted or preformed to some extent. Ceramic compacts may include materials to aid in sintering such as a solvent or a binder. Before or during sintering, the material may be heated to a sufficiently high temperature to remove any solvent, binder, and/or any other organic material.

In some embodiments, a ceramic compact may be in the form of a green sheet comprising ceramic particles.

In some embodiments, the garnet material, and other materials such as flux additives, plasticizers, solvents useful to create a slurry or green sheet, can be those materials as described in U.S. Pat. No. 8,283,843, filed Jan. 28, 2011 and U.S. Pat. No. 8,169,136, filed Feb. 19, 2009, which are incorporated by reference herein for all they disclose regarding materials for creating slurries or green sheets.

Figure 4:
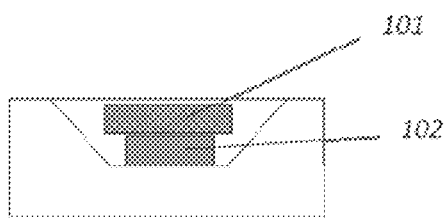
FIG. 4 illustrates an embodiment of a light-emitting device that includes a ceramic phosphor.

FIG. 4 shows an example of one way that a phosphor ceramic may be integrated into an LED. A phosphor ceramic 101 may be disposed above an LED 102 so that light from the LED passes through the phosphor ceramic before leaving the system. Part of the light emitted from the LED may be absorbed by the phosphor ceramic and subsequently converted to light of a lower wavelength by luminescent emission. Thus, the color of light-emitted by the LED may be modified by a phosphor ceramic such as phosphor ceramic 101.

EXAMPLES

Example 1

$Y_2O_3$ particles (57.06 g, 99.99% purity), with a Brunauer-Emmett-Teller (BET) surface area of approximately 3.0 $m^2$/g, and $Al_2O_3$ powder (42.94 g, 99.99% purity), with a BET surface area of 5.6 $m^2$/g, were added to a high purity $ZrO_2$ ball mill jar (Torrey Hills Technologies, LLC, San Diego, Calif.). The total powder weight was 100.00 g and the mixing ratio of $Y_2O_3$ to $Al_2O_3$ was at a stoichiometric ratio of 3:5 in mol % for forming yttrium aluminum garnet. Dispersant (2.00 pph, 2.00 g) and tetraethyl orthosilicate (0.50 pph, 0.50 g) as a sintering aid were also added to the mill jar. Toluene (33.33 g) was added to the mill jar, and the contents in the mill jar were then stirred by hand until the mixture seemed liquid-like. $Y_2O_3$ (130 g, 5%), and a stabilized $ZrO_2$ ball of 3 mm diameter were added to the mill jar, and the mixture in the mill jar was milled by a bench-top planetary ball mill (MTI Corporation, Richmond, Calif.) for about 24 hrs. as a first mixing step.

Concurrently, a binder solution of polymeric binder and plasticizers was prepared by dissolving 21.00 g poly(vinyl butyral-co-vinyl alcohol-co-vinyl acetate) (PVB), 10.50 g benzyl n-butyl phthalate (BBP), and 10.50 g polyethylene glycol (PEG) in 90 g toluene while stirring all for about 24 hrs.

Binder solution (47.14 g) prepared as above was added to the milled solution of ceramic particles in the mill jar so as to contain 7.50 pph PVB, 3.75 pph BBP, and 3.75 pph PEG in the final slurry. Then this mixture was further ball-milled by the bench-top planetary ball mill for about an additional 24 hrs. When the entire ball milling process was completed, the resultant slurry was filtered through a syringe-aided metal screen filter with pore size of 0.05 mm, in order to remove aggregated ceramic particles. Viscosity of the resulted slurry was in the range of 400 cP to 800 cP. The slurry was then cast on silicone-coated polyethylene teraphthalate substrate with an adjustable film applicator (Paul N. Gardner Company, Inc., Pompano Beach, Fla.) at a cast rate of 300 mm/min. The blade gap of the film applicator was adjusted depending on the desired green sheet thickness. The cast tape was dried at ambient atmosphere to finally obtain an approximately 80~100 μm thick ceramic green sheet.

The dried green sheet was cut to the appropriate size by razor blade, the cut green sheets were detached from the PET substrate, and plural sheets were layered to obtain the desired thickness of the green sheet laminates in the range of 80 micron to 3.0 mm thick. This assembly was laminated at 24 MPa at room temperature for about 5 min., followed by 16 MPa at about 85° C. for about 5 min. using a TBH-100H heating press (Sansho Industry, Japan). The laminated compacts were then cut using the VLS 2.30 laser engraving and cutting system (Universal Laser Systems) with a 25 W $CO_2$ laser to obtain green laminate compacts of 12 mm×12 mm, 30 mm×30 mm, or 50 mm×50 mm square shapes, or an 80 mm diameter disc. Each size of the cut laminate compacts was 10 mm×10 mm, 25 mm×25 mm, or 40 mm×40 mm square shapes, or a 65 mm diameter disc-shape flat ceramic piece, respectively.

As the next step, the polymeric binder was removed from the laminated compacts. The laminated compacts were sandwiched between $Al_2O_3$ porous cover plates with 40% nominal porosity, in order to avoid the warping, cambering and bending of the laminated compacts during the debinding process. A plurality of green laminate compacts was stacked between porous $Al_2O_3$ cover plates (ESL ElectroScience, King of Prussia, Pa.), alternately. The laminated compacts were heated to about 1200° C. for about 2 hrs. in air using a ST-1700C-445 box furnace (SentroTech Corporation, Brea, Ohio). The heating and cooling rates were <0.7° C./min. and <4.0° C./min., respectively. The debinded green compacts were fully sintered at 1800° C. for about 5 hours under $10^{-3}$ Torr vacuum using a high temperature furnace whose heating elements were made of tungsten. Inside the furnace chamber, the ruminate compacts were sandwiched with tungsten mesh and tungsten plates, alternately. The tungsten mesh types used are summarized in Table 1, below. See Comparative Example 4.

The heating rate of this sintering process was about 16.7° C./min. (~400° C.), 8.0° C./min. (400~1000° C.), 5.0° C./min. (1000-1400° C.), 3.3° C./min. (1400-1500° C.), and 1.5° C./min. (1500-1800° C.), whereas the cooling rate was 8.0° C./min. in order to minimize cracking during sintering.

Tungsten mesh provides "point contact" (not "area contact") support during sintering. This point contact allows the thin green compact to shrink during sintering at high temperature. As a result, the YAG flat ceramic pieces were sintered at 1800° C. without cracking due to the tungsten mesh.

In summary, the green compacts were successfully sintered to be substantially flat, thin ceramic pieces without cracking regardless of (a) slurry type, with xylene-ethanol mixed solvent, toluene, or water; or, (b) the doping elements for YAG ceramics; or, (c) different sintering temperatures between 1700-1800° C.; or, (e) existing air voids in the final sintered YAG plates (instead of fully transparent YAG plates) for light scattering. These methods should be applicable not only to vacuum sintering but also $H_2$ sintering.

Example 2

Aqueous slurry was prepared as set forth in Example 1, except that 54.84 g $Y_2O_3$ particles, 41.27 g $Al_2O_3$ powder, 16.20 g aqueous acrylic polymer solution (WB4101, Polymer Innovations Inc., Vista, Calif.) as a main component of polymeric binder for final green sheet, 0.18 g aqueous solution of 2,4,7,9-tetramethyl-5-decyne-4,7-diol ethoxylate solution (DF002, Polymer Innovations Inc.) as a de-foamer for aqueous slurry, 1.79 g of aqueous 2-amino-2-methyl-1 propanol solution (PL008, Polymer Innovations Inc.) as a plasticizer, and 45.00 g milli-Q water were added to a 12 oz. (0.341) polypropylene (PP) thick wall jar, with an inner diameter of 80 mm (Parkway Plastics Inc., Piscataway, N.J.).

The contents in the PP jar were then shaken by hand until the mixture seemed liquid-like. A 570 g $ZrO_2$ ball for milling was added to the PP jar, and the mixture in the PP jar was milled at 96 rpm by 700 series "roller-type" jar mill (US Stoneware, East Palestine, Ohio) for about 16 hrs. Afterwards, an additional 20.72 g WB4101 was added to the milled solution of ceramic particles in the PP jar to finally contain 60 vol % ceramic powders in the final slurry. Then this mixture was further milled by the roller-type jar mill for an additional approximately 4 hrs. When the entire ball milling process was completed, the resultant slurry was filtered through a syringe-aided metal screen filter with pore size of 0.05 mm, in order to remove aggregated ceramic particles. Viscosity of the resulted slurry was in the range of 200 cP to 350 cP. The slurry was then cast on silicone-coated polyethylene teraphthalate substrate with an adjustable film applicator (Paul N. Gardner Company, Inc., Pompano Beach, Fla.) at a cast rate of 300 mm/min. The blade gap of the film applicator was adjusted depending on the desired green sheet thickness. The cast tape was dried at 65° C. for at least 10 min. to finally obtain an approximately 80-100 μm thick ceramic green sheet.

Comparative Example 1

YAG flat ceramic pieces were sandwiched with heavy weight tungsten plates (w/o tungsten mesh) to reduce warpage as shown in FIG. 1A. The yield was only approximately 50% after sintering using a high temperature vacuum furnace (1800° C.). Of the samples, 50% were cracked where a small area of the samples appeared to be stuck on the tungsten plate, and such area contact (not the spot contact, as in the mesh) constrained the shrinkage during sintering, which led to the cracking during sintering.

Comparative Example 2

YAG flat ceramic pieces were sandwiched with porous zirconia plates (instead of tungsten mesh+tungsten plates) to protect from warpage. Zirconia plates were selected due to zirconia's high melting point (~2400° C.). Although the utility of zirconia cover plates occasionally resulted in the desired level of flatness of the obtained YAG ceramics, the surface of the YAG plates often reacted with the zirconia cover plates above 1675° C., thus the non-homogeneous surface roughness on the YAG plate surface can easily be found visually. Additionally, YAG ceramics cannot be sintered above 1700° C., since the YAG and zirconia often reacted at high temperature, and 2 oxide flat ceramic pieces were adhered at such high temperature.

Figure 5:
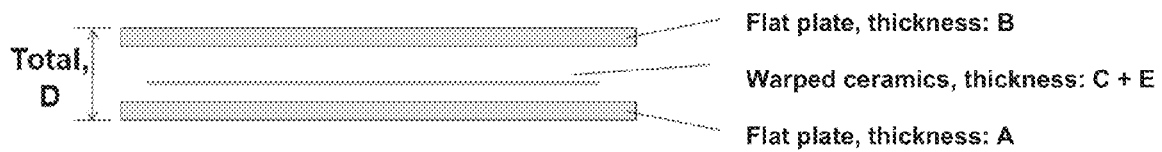
FIG. 5 illustrates a measurement of camber, as in Example 3.

In another example, molybdenum foil was used, interposed between the zirconia plates and the YAG flat ceramic pieces. This enabled YAG plates to be sintered at higher temperature (1700° C.), but the flatness of the sintered YAG plates was not as desired, although the transparency was improved. See FIG. 5.

Comparative Example 3

YAG flat ceramic pieces were sandwiched with molybdenum foil (instead of tungsten mesh) to reduce warpage. This enabled YAG plates to be sintered at a higher temperature (>1700° C.). Additionally, the YAG ceramics were not cracked during the sintering and the uniform and high transparency was maintained. This may have been due to the lack of the reaction between YAG and molybdenum during sintering at high temperature. However, the desired level of flatness of the sintered YAG plates was not achieved. Only warped flat ceramic pieces were obtained. During the sintering at high temperature, the molybdenum foil was also warped, and this may have caused the warpage of the sintered YAG ceramics.

Comparative Example 4

YAG flat ceramic pieces were sandwiched with very rough tungsten 6 mesh with a very thick tungsten filament diameter. Due to the very rough mesh structure, the sintered YAG ceramics showed slight warpage following the mesh structure, although no observable cracking was observed and the yield remained 100%.

The results of testing various materials are summarized in Table 1 below. Using zirconia at 1800° C.: all of the ceramic was cracked and stuck to the zirconia. Using molybdenum at 1800° C.: there was no cracking, but foil warped at high temperature. Using tungsten plate at 1800° C.: 75%-50% of the material was cracked (i.e., visible cracks).

Example 3

Warpage Measurement

Thirteen samples were made as described above (see, e.g., Example 1), and the samples were then measured for camber using a micrometer and a caliper. A micrometer has a measuring interface (tip, about 5 mm diameter) with a smaller surface area. A caliper has a larger surface area measuring interface (jaw face about 30 mm). Each sample was measured with both instruments. The results are summarized in Table 2 below. "Good" samples will have substantially the same thickness when measured by micrometer or caliper, indicating little or no warpage. As is evident from the results in Table 2, all thirteen samples made according to the methods described herein were good samples and demonstrated little or no warpage.

TABLE 2

| # | Micrometer (micron) | Caliper (mm) |
|---|---|---|
| 1 | 163 | 0.16 |
| 2 | 148 | 0.14 |
| 3 | 147 | 0.15 |
| 4 | 162 | 0.16 |
| 5 | 167 | 0.17 |
| 6 | 182 | 0.18 |
| 7 | 160 | 0.16 |
| 8 | 194 | 0.19 |
| 9 | 199 | 0.2 |
| 10 | 167 | 0.17 |
| 11 | 388 | 0.4 |
| 12 | 398 | 0.4 |
| 13 | 377 | 0.38 |

Example of Warpage Measurement

Two flat plates are disposed parallel to each other a given distance apart. See FIG. 5. The total thickness (D) of the plates (distance A+B) and the vertical displacement of the sample with warpage (distance C+E) are measured by a micrometer, where C is the known thickness of sample without warpage, and E is amount of warpage. The outside surfaces of the two parallel plates are placed within the measur-

TABLE 1

List of sandwiching material during YAG sintering

| | Material | Type | Wire diameter | Mesh size (wires/inch) | Thickness |
|---|---|---|---|---|---|
| Good | Tungsten | Mesh | 102 micron (0.004 inch) | (60 × 60) | |
| Good | Tungsten | Mesh | 127 micron (0.005 inch) | (40 × 40) | |
| Good | Tungsten | Mesh | 69 micron (0.0027 inch) | (50 × 50) | |
| Good | Tungsten | Mesh | 102 micron (0.004 inch) | (30 × 30) | |
| Good | Tungsten | Mesh | 102 micron (0.004 inch) | (50 × 50) | |
| Good | Tungsten | Mesh | 381 micron (0.004 inch) | (10 × 10) | |
| not good | Zirconia | Plate | | | 1.0 mm |
| not good | Molybdenum | Thin foil | | | 50 micron (0.002 inch) |
| not good | Tungsten | Plate | | | 381 micron (0.015 inch) | ing distances of a micrometer. The plates are disposed a distance sufficient to insert the sample between the plates. Once inserted, the jaws are closed until the jaws touch the plates, and the total distance between the jaws is measured by the micrometer (D). The amount of warpage (E) of the sample, then, can be calculated by D−(A+B+C), in which the known distance values of the plates and unwarped sample are subtracted from the total distance measured. Warpage measurements will demonstrate that the currently described production method reduces the warpage of the material.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A method of sintering a ceramic to produce a sintered ceramic plate, comprising:
   heating a ceramic precursor material between a first mesh and a second mesh;
   wherein at least a first portion of a first side of the ceramic precursor material contacts the first mesh and at least a second portion of a second side of the ceramic precursor material contacts the second mesh during heating, thereby producing a sintered ceramic plate;
   wherein the ceramic precursor material is in the form of an unsintered ceramic compact comprising ceramic particles; and
   wherein the sintered ceramic plate is a translucent phosphor.

2. The method of claim 1, wherein either or both of the first mesh and the second mesh are composed of heat conductive material.

3. The method of claim 2, wherein the heat conductive material has a degradation temperature greater than the sintering temperature of the unsintered ceramic compact.

4. The method of claim 3, wherein the degradation temperature is at least 200° C. greater than the sintering temperature.

5. The method of claim 1, wherein the heat conductive material is selected from stainless steel, iron alloys, copper alloys, niobium, molybdenum, nickel alloys, platinum, tantalum, titanium and tungsten.

6. The method of claim 1, wherein the ceramic precursor material slidably contacts the first mesh and the second mesh.

7. The method of claim 6, wherein the ceramic precursor material slidably contacts the first mesh and the second mesh at a plurality of substantially periodic contact points.

8. The method of claim 6, wherein the ceramic precursor material slidably contacts the first mesh and the second mesh at a plurality of substantially uniformly distributed contact points.

9. The method of claim 6, further comprising applying sufficient pressure to the precursor material to reduce camber of the sintered ceramic plate but allow sliding engagement of the ceramic precursor material with the first mesh and the second mesh.

10. The method of claim 9, wherein the applying sufficient pressure comprises placing a metal plate of about 0.1 gm/cm$^2$ to about 20 gm/cm$^2$ on the first mesh.

11. The method of claim 1, wherein the ceramic precursor material is a product of a slurry of solvent, binder and ceramic particles that have been heated at a sufficiently high temperature to evaporate or burn substantially all of the binder and solvent.

12. The method of claim 1, wherein the ceramic precursor material is in the form of an unsintered green sheet comprising ceramic particles.

13. The method of claim 1, wherein camber of the sintered ceramic plate is less than 50 μm/mm$^2$ vertical displacement.

14. The method of claim 1, wherein either or both of the first mesh and the second mesh have a mesh size of more than about 7 wires per inch and a wire diameter of less than 400 μm.

15. The method of claim 1, wherein either or both of the first mesh and the second mesh comprise plural interwoven wires, wherein the plural interwoven wires provide a plurality of substantially uniformly distributed contact points in a plane.

16. The method of claim 1, wherein the ceramic precursor material is in the form of an unsintered ceramic compact comprising an oxide material.

17. The method of claim 16, wherein the oxide material comprises a metallic element.

18. The method of claim 16, wherein the oxide material comprises silicon.

19. The method of claim 1, wherein the ceramic precursor material is in the form of an unsintered ceramic compact comprising a garnet material.

20. The method of claim 19, wherein the garnet material comprises yttrium.

21. The method of claim 1, wherein the ceramic precursor material is in the form of an unsintered ceramic compact comprising a nitride material.

22. The method of claim 1, wherein the ceramic precursor material is in the form of an unsintered ceramic compact comprising an oxynitride material.

23. The method of claim 22, wherein the oxynitride material comprises a metallic element.

24. The method of claim 22, wherein the oxynitride material comprises silicon.

25. The method of claim 1, wherein either or both of the first mesh and the second mesh comprise wires intersecting at an angle of 90°.

26. The method of claim 1, wherein either or both of the first mesh and the second mesh comprise wires intersecting at an angle of about 10°, about 15°, about 30°, about 45°, about 60°, or about 80°.

27. The method of claim 1, wherein either or both of the first mesh and the second mesh have a mesh size that is about 5 wires per inch to about 500 wires per inch.

28. The method of claim 27, wherein the mesh size is about 7 wires per inch to about 200 wires per inch.

29. The method of claim 28, wherein the mesh size is about 10 wires per inch to about 200 wires per inch.

30. The method of claim 29, wherein the mesh size is about 10 wires per inch to about 100 wires per inch.

31. The method of claim 30, wherein the mesh size is about 10 wires per inch, about 30 wires per inch, about 40 wires per inch, about 50 wires per inch, or about 60 wires per inch.

32. The method of claim 1, wherein either or both of the first mesh and the second mesh have a mesh size that is the same in both dimensions.

33. The method of claim 1, wherein either or both of the first mesh and the second mesh have a mesh size that is not the same in both dimensions.

* * * * *